United States Patent

Sharma

[15] 3,703,006

[45] Nov. 14, 1972

[54] ALGORITHM FOR SYNTHESIZING ECONOMICAL DATA COMMUNICATION NETWORK

[72] Inventor: Roshan La. Sharma, Tustin, Calif.

[73] Assignee: Collins Radio Company, Dallas, Tex.

[22] Filed: Oct. 28, 1970

[21] Appl. No.: 84,690

[52] U.S. Cl. .......... 444/1

[51] Int. Cl. .......... G06f 15/56

[58] Field of Search .......... 444/1; 235/151.2

[56] References Cited

OTHER PUBLICATIONS

Amara, R.C. et al., Link Error Control and Network Route Selection, In IRE Trans. Comm. Sys. CS–9(12): pp. 328–334, Dec. 1961, TK5101. I22.

McCracken, D.D. et al., Numerical Methods and Fortran Programming, N.Y., John Wiley and Sons, Inc., 1964, P2–3.

*Primary Examiner*—Eugene G. Botz
*Assistant Examiner*—R. Stephen Dildine, Jr.
*Attorney*—Robert J. Crawford and Bruce C. Lutz

[57] ABSTRACT

A technique for optimizing the connections of a plurality of stations to a central point wherein a connection link has a predetermined maximum line weight and where optimum is defined as a distance related cost comprising setting up a trial configuration in a computer and interchanging stations on adjacent links on a sequential and selective basis and comparing the cost of each selection with the previous lowest cost connection until a predetermined number of comparisons and selections have been completed.

5 Claims, 5 Drawing Figures

M = MAXIMUM LINK WEIGHT FOR COMMUNICATIONS LINK
Li = A PARTICULAR LINK OF A NETWORK
So = DATA CENTER
Si = A PARTICULAR CITY OR STATION IN THE NETWORK
S(i) = A CITY OR STATION BELONGING TO LINK Li
Wi = WEIGHT OF Li

M = MAXIMUM LINK WEIGHT FOR COMMUNICATIONS LINK
Li = A PARTICULAR LINK OF A NETWORK
So = DATA CENTER
Si = A PARTICULAR CITY OR STATION IN THE NETWORK
S(i) = A CITY OR STATION BELONGING TO LINK Li
Wi = WEIGHT OF Li

FIG. I

INVENTOR.
ROSHAN L. SHARMA
BY Bruce C Lutz
ATTORNEY

INVENTOR.
ROSHAN L. SHARMA
BY Bruce C Lutz
ATTORNEY

INVENTOR.
ROSHAN L. SHARMA

BY Bruce C Lutz
ATTORNEY

INVENTOR.
ROSHAN L. SHARMA

BY Bruce C Lutz
ATTORNEY

INVENTOR.
ROSHAN L. SHARMA
BY Bruce C Lutz
ATTORNEY

ALGORITHM FOR SYNTHESIZING ECONOMICAL DATA COMMUNICATION NETWORK

THE INVENTION

The present invention is related generally to a communication system and more specifically to a method of and apparatus for obtaining a near optimal connection of communication nodes to a central station.

Generally, a communication grows slowly with new nodes being added to a communication link in a rather haphazard manner as new nodes are added to a communication system. Normally, the connections are not planned in advance and therefore the resulting system of communication links is not optimized as to cost of operation. In general, a communication system has some predetermined maximum number of lines that can be utilized with a central station. While each link may not have the same predetermined maximum, the general situation does have equal limits or maximums for the number of lines per link. Further, most systems have a cost which is directly associated with the length of the total link path as connected.

The present invention provides a method for providing a near optimal connection of stations by first providing a trial connection pattern utilizing one of several possible methods and then optimizing this trial configuration by interchanging nodes from adjacent links to determine the lowest cost of the first and later trial configurations. If enough interchanges are provided, the resulting system can be optimized. Even if only a couple of trial interchanges are made for each node, the resulting system will normally be within the range of 7 percent of the optimum configuration. A majority of the time this method of providing near optimal connections will be within 5 percent of optimum conditions.

It is therefore an object of the present invention to lower the cost of implementing a system connection configuration of a plurality of weighted nodes to a central point and to provide a near optimal resulting system configuration where a connection link has a maximum weight limitation and where total distance is a factor.

Figure 5:
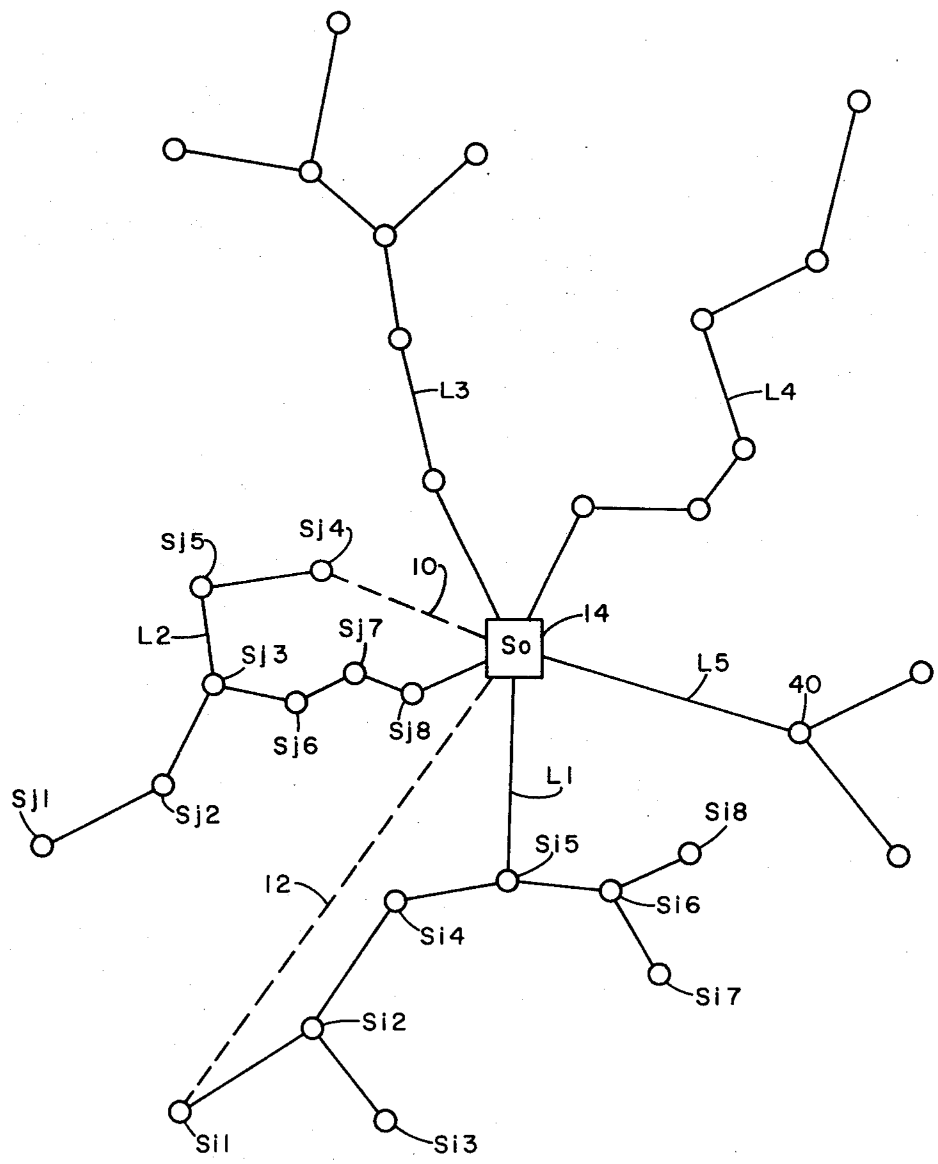

Other objects and advantages of the present invention will be apparent from a reading of the remaining specification and appended claims in conjunction with the drawings wherein:

FIGS. 1–4 illustrate a flow diagram to be utilized in writing a general purpose computer program in accordance with the present invention; and FIG. 5 is a possible resulting configuration solved in accordance with a program written in accordance with the flow diagrams of FIGS. 1–4.

It is to be realized that the present invention, while directed in particular to a communication system, may be applicable to any system wherein the connection of a plurality of weighted nodes is desired to a central point with total connection distance and individual connection weights being factors in the system configuration.

As is the situation with most operations completed by a computer, the present invention can be completed manually by a laborious process of manually performing all of the calculations and comparisons making such an operation economically unattractive. Completely optimal solutions are also possible using techniques in conjunction with a computer by means not shown or described but which also would require a level of time and manual effort such that a completely optimum solution is also economically unattractive. The present invention, while not providing necessarily the most optimum solution, does provide a solution which is nearly optimal and normally takes only a few minutes of computer time.

The first step in performing the invention is to determine the maximum link weight (or number of lines) to be utilized in the system. Each of the nodes, such as S*i*1, S*j*1, etc., is examined to determine if the total line requirements or station weight exceeds that of a link capability. If so, a number of lines shown as dash lines 10 and 12 of FIG. 5 are connected directly from the station to a data center So (14) as shown in FIG. 5.

After the links such as 10 and 12 have been established to leave only a connection of remaining nodes each of which has a weight less than the weight of a link allowable maximum, a first trial connection of links may be completed. One method of providing such an initial set of trial connections is to calculate the angle of each node with respect to data center 14. A particular node, normally the furthest away from data center 14 is then selected and it is connected to all the nodes which are closest to the angle of the first node until the prescribed link weight is approximated but not exceeded. Then, a new node is selected, which has not been previously assigned to a link, and the process is repeated until each node is assigned to a given link. Each node, other than those nodes which were originally of too great a weight, is connected to only one link.

Figure 1:
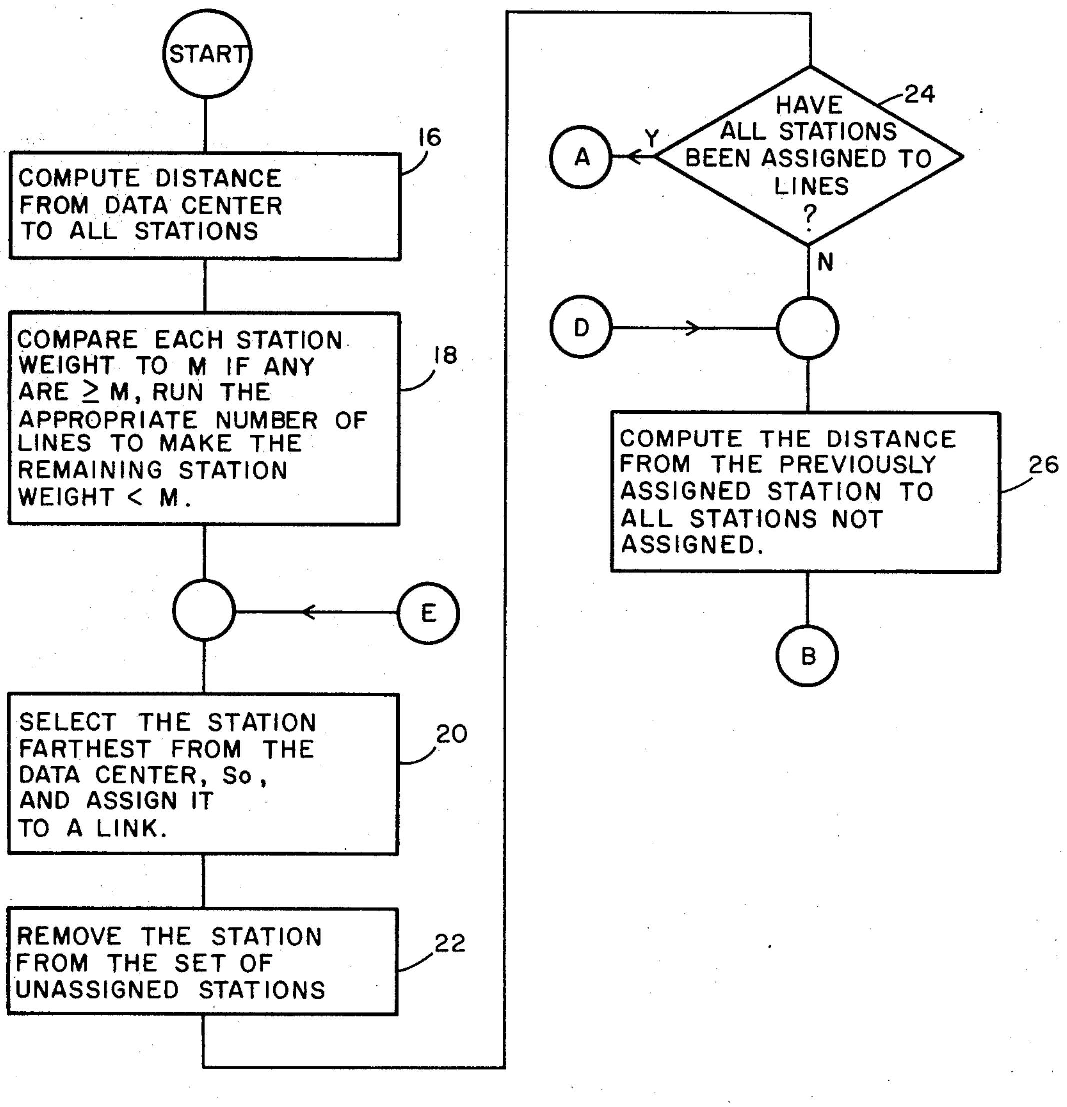
Figure 2:
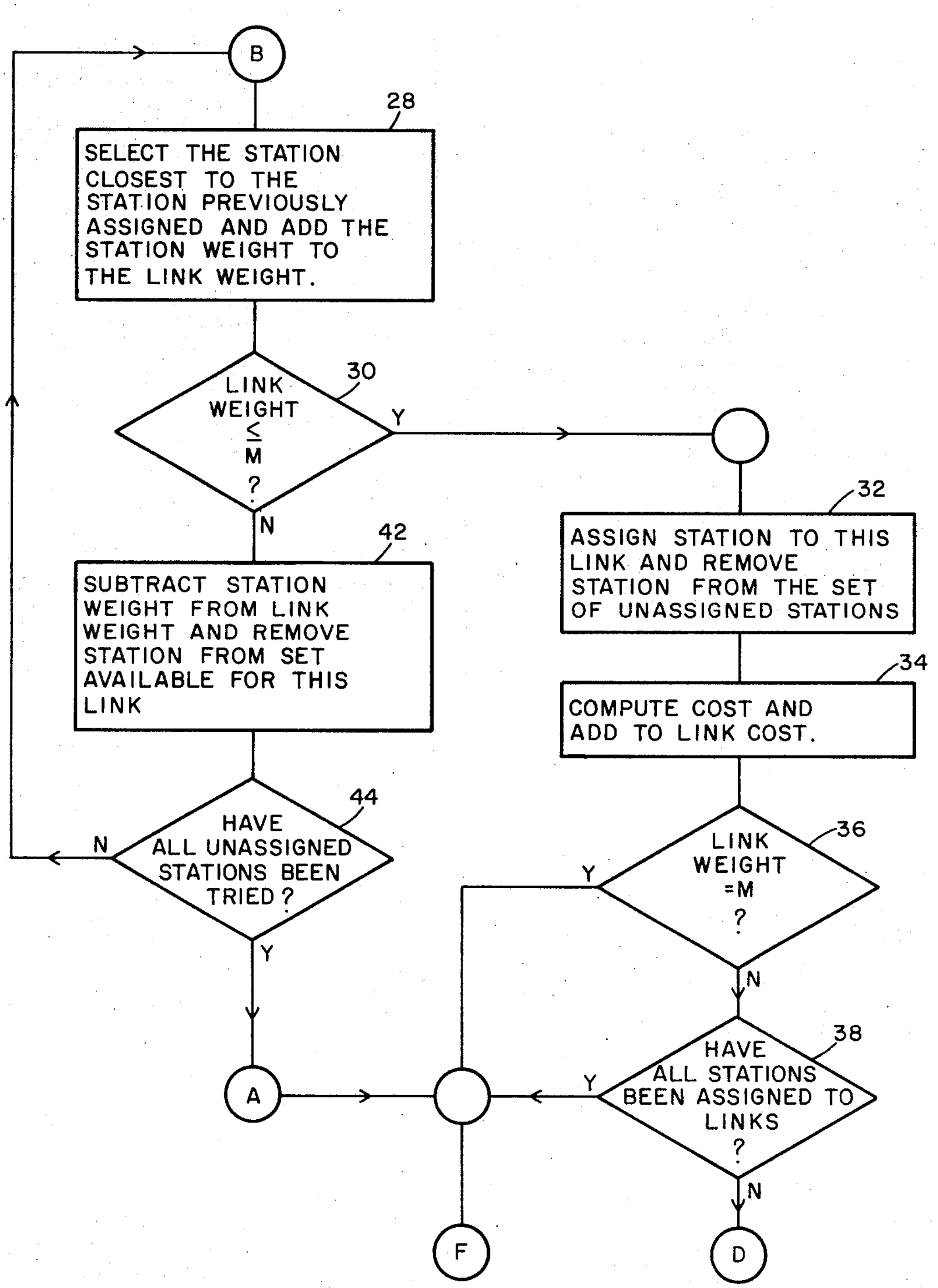
Figure 3:
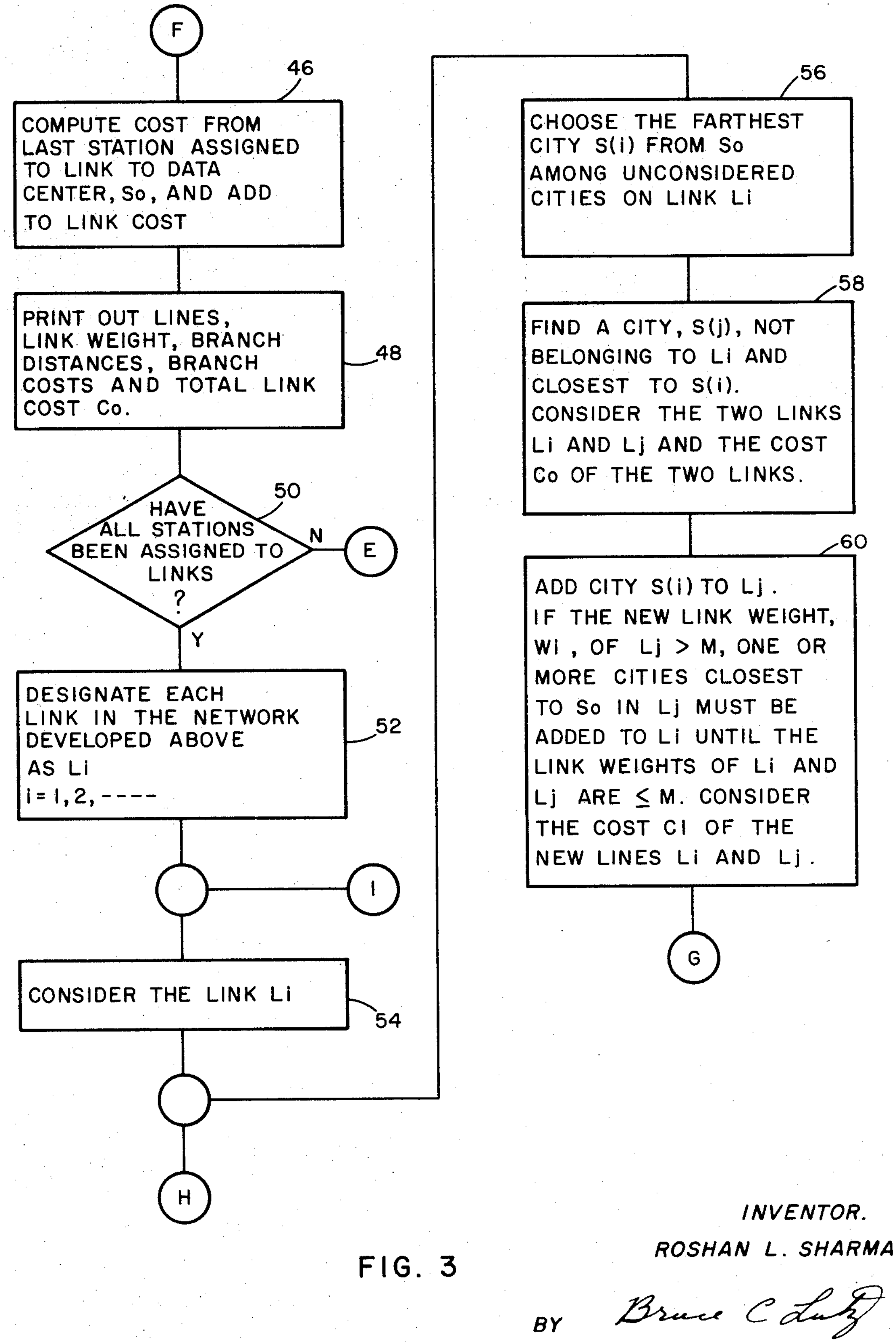
Figure 4:
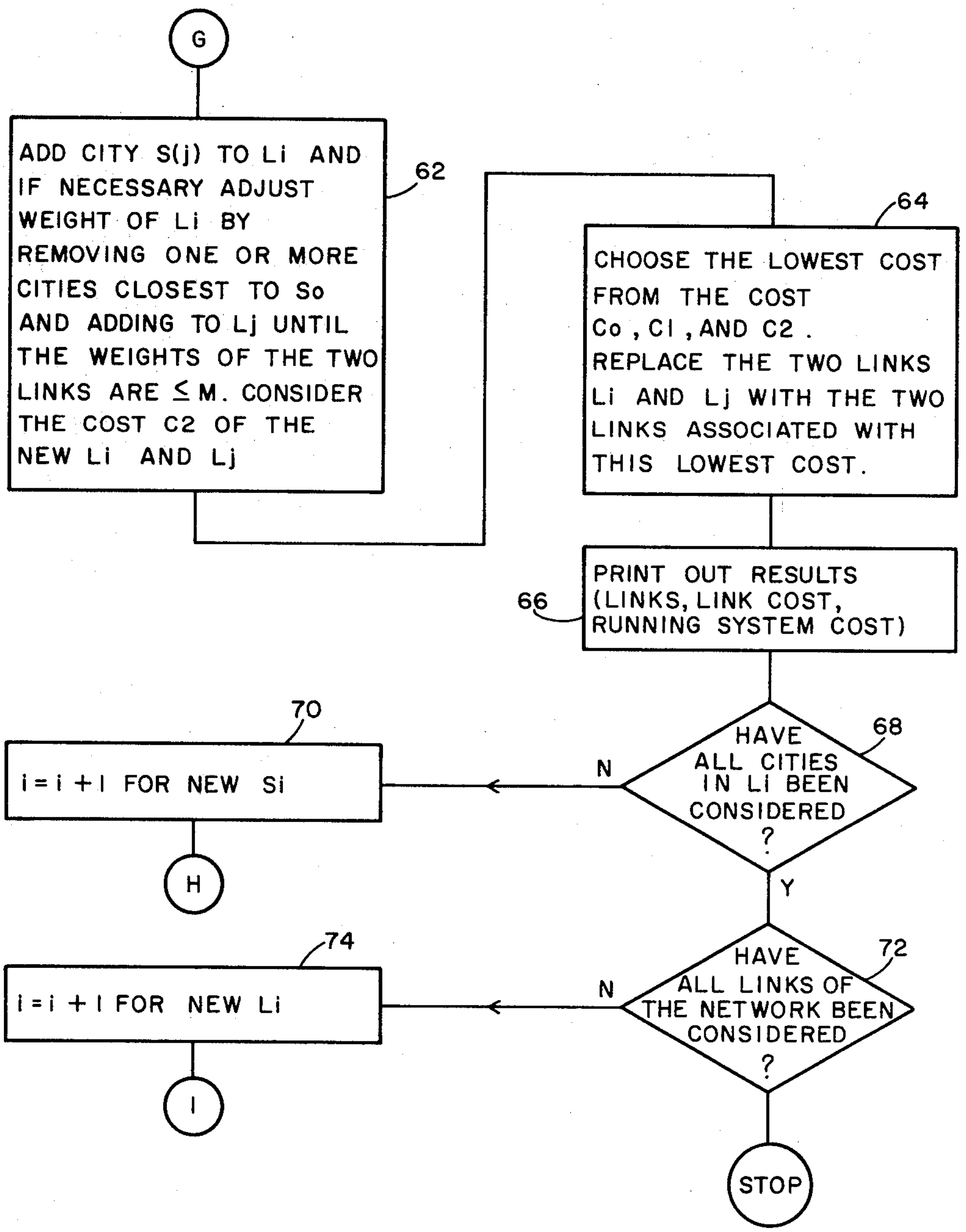

A second method for providing the first trial set of links is as outlined in the flow diagrams as shown in FIGS. 1, 2, and part of FIG. 3.

In this method, referring to FIG. 1, the initial set-up conditions are illustrated in blocks 16 and 18 wherein the lines 10 and 12 of FIG. 5 are produced. After completion of the auxiliary links, a station such as Si1 of FIG. 5 is selected in accordance with block 20. Since the flow diagram is set up for a repetitive process until all stations have been assigned, the removal of the station from the set of unassigned stations must be completed as illustrated by block 22 and a decision must be made if all stations have been assigned as shown by decision block 24. If they have not been all assigned, as would be in a starting situation, the distance to all unassigned stations is calculated as indicated in block 26. The closest node to node S*i*1 is S*i*2 and this is selected as indicated by block 28. The link weight is examined and since in this case it is not equal to the maximum as shown by decision block 30, the station Si2 is assigned to the link and removed from the set of unassigned stations as illustrated by block 32. The cost of the lines comprising the link of S*i*1 to S*i*2 is computed and added to the link cost as indicated by block 34. The link weight is checked by block 36 and if it does not equal the maximum, a check is made to ascertain if all stations have been assigned to links as indicated by 38. Since all stations have not been assigned, the program returns to step 26 and add S*i*3 to the link. This is repeated until the node 40, which is eventually shown as being assigned to link L5, is selected and found to exceed the maximum permissible weight. Upon this finding in decision block 30, the station weight of node 40 is subtracted from the link weight of link L1 and node 40 is removed from the set of stations available for use with this link as indicated in block 42. As illustrated in FIG. 5 no other links were found to be suitable after trying all remaining stations via decision block 44. This finally results in a connection from node Si5 to data center or central point 14.

At this point the cost of link L1 is obtained as shown in block 46 and outputted as described in block 48. The decision block 50 indicates that there are still other stations to be assigned to links and at this point it may select node Sj1 and repeat the process until all nodes are connected in links. As indicated by block 52 each link is provided with a designation such as link L1–L5.

At this point a set of trial link connections has been completed and the optimization technique may be started. Applying the blocks of FIGS. 3 and 4 to the diagram of FIG. 5, link L1 is chosen according to block 54 and the furthest city or node S*i*1 is chosen according to block 56. The closest city to Si1 and not belonging to link 1 is S*j*1 and is chosen in accordance with block 58. The cost of the links L1 and L2 are stored for reference. Node S*i*1 is added to link L2 as indicated by block 60 and if the total weight of link L2 with S*i*1 added thereto is greater than the predetermined maximum, some of the closer nodes such as S*j*7 and S*j*8 are reassigned, at least temporarily, from link L2 to link L1 until the total link weights of each of these two adjacent links are equal to or less than the predetermined maximum.

While these two links are described as adjacent, there may of course be circumstances where a short link is intermediate links L1 and L2 but where there is no node on this intermediate link which is closer to S*i*1 than is S*j*1.

The reverse substitution of node S*j*1 into link L1 is then completed according to block 62 whereby the nodes S*j*8 and/or S*j*7 may need to be transferred back from link 1 and link 2 reducing link weight below the stated maximum. As indicated in blocks 60 and 62 the cost of the two trial links are calculated and according to block 64 the lowest cost for the two links L1 and L2 for each of the three trial connections is compared and the system having the configuration which results in the lowest cost for the combination of links L1 and L2 is stored in memory. The cost results are printed according to block 66 and a check is made by block 68 to ascertain if all the nodes of link L1 have been considered. If not, the node designation is incremented by 1 in block 70 to consider Si2 and the process repeated starting from block 56. When all the nodes in link L1 have been considered and possibly interchanged with adjoining nodes, the block 72 checks to make sure whether or not all links of the network have been considered. If not, the link designated is incremented as indicated in block 74 and the system returns to block 54 for further comparisons until all nodes and all links have been evaluated.

In summary, the concept of the present invention is to provide a solution to a connection of weighted nodes which while not necessarily optimum is at least economically feasible. This is accomplished by providing a first trial set of link connections in any of various manners and then interchanging nodes in a given link with nodes in another link to establish the link configuration having the lowest cost. The number of interchanges and comparisons permitted for each node will of course directly affect the total time for the near optimum result to be calculated and completed. Thus, definite limits must be placed as to the interchanges permitted. From the above it will be realized that the selection of the link configuration is determined by the total cost before and after each interchange.

While a specific computer has not been illustrated for performing the present technique, it will be realized by those skilled in the art That any general purpose computer can be programmed in accordance with the flow diagram illustrated and that special purpose digital and analog computers may be designed specifically for implementing the present technique.

For definitive purposes in this description of the invention and the claims, a preferred cost is a cost which is near the optimum or minimum cost. A program may comprise the normally apparent procedure utilized in directing a general purpose computer. However, a program can be considered to be the design configuration of a special purpose or analog computer. Suboptimal in reference to the network configuration design is utilized in conjunction with the intent that a configuration be produced economically while still being near the optimum in terms of operational cost of the finished product (the connected system) designed. Where "-weights" are used in conjunction with links, the number of lines in a communication system or number of communication channels per line is equivalent terminology. In some instances the link weight may not equal the predetermined maximum after calculations are completed because the program may not find other nodes which will satisfactorily complete a link without exceeding the predetermined maximum. In this connection the link weight will be substantially equal to the predetermined maximum.

Therefore, I wish to be restricted not to the specific example illustrated but to the general technique of optimizing a trial set of system link connections through a system of interchanging nodes between links as claimed infra.

I claim:

1. The method of obtaining a preferred cost connection of a plurality of stations to a common center wherein the total cost is based on total distances involved in connecting said stations to the common center and the weights associated with the station connections comprising the steps of operating a computer under the control of stored program to:

select a station S11 furthest from the common center and assign it to a designated link;

select further stations for assignment to said designated link, each station of which is the closest to the last selected station, until the total link weight substantially equals a predetermined maximum;

compute the cost CO of the link from the furthest station to the common center upon consideration of the respective station connection weights;

repeat the selection and computation process for all previously unassigned stations until all stations are assigned in n links;

designate the links L1 to Ln as a first trial set;

form a second trial set of links on a pair-by-pair basis as follows:

choose the furthest city S11 from said common center in link L1, remove a station, S21 of another link L2, closest to said furthest city S11 from L2 and add it to the link L1, subtract stations from said L1 link which are closest to said common center, add them to said L2 link from which said closest city S21 was removed until the link weights of both links L1 and L2 are less than or equal to said predetermined maximum, and calculate the cost C1 of links L1 and L2 in their second trial form;

form a third trial set of links on a pair-by-pair basis as follows:

remove the city S11 from link L1 and add it to said link L2, adjust the weight of the two links L1 and L2 by removing one or more stations closest to said data center from said link L2 and adding said stations to said link L1 until the weights of the two links are equal to or less than said predetermined maximum link weight, calculate the cost C2 of links L1 and L2 in their third trial form;

compare costs C0, C1, and C2 of the three variations of link configurations and select the lowest cost configuration therefrom; and repeat the station interchange and link cost computation process for each station in each link until all stations and links have been considered.

2. The method of providing a near optimum set of communication links between remote stations and a central data point wherein optimum is defined as lowest cost and wherein each communication link cannot exceed a predetermined weight comprising operating a computer under the control of a stored program to perform the steps of:

selecting a first trial set of communication links starting with a furthest unassigned station and connecting closest stations thereto to form a link which does not exceed said prescribed maximum weight until all stations have been assigned to one of said set of first trial links;

calculating the cost of each of said first trial set of links;

interchanging stations between adjacent links and adjusting said links where necessary as interchanged until said link weights do not exceed said prescribed maximum;

calculating the cost of said links after interchanging to provide second trial links;

selecting the lowest cost link configuration between adjacent first and second trial links;

interchanging, calculating, and selecting further interchanged station link configurations until all stations have been considered; and providing an output indicative of the results of the finally selected link configurations.

3. Apparatus for economically providing an output indicative of a near minimal cost set of connection links of remote weighted stations to a central point wherein the cost is a function of distance and a given link has a prescribed maximum weight comprising:

first means for supplying inputs of the weight of each station and of the location of each station; and computer means connected to receive inputs from said first means and programmed for mathematically solving the minimum cost condition wherein the program directs said computer means to sequentially carry out the steps of 1. connect all stations in a set of first trial links where each link weight is equal to or less than the prescribed maximum,
2. calculate the cost of each first trial link,
3. sequentially interchange stations between adjacent links to sequentially produce second sets of trial links, calculate the cost of each set of second trial links, sequentially select the lower cost set of trial links, and
4. provide an output indicative of the finally selected set of links.

4. Apparatus for economically providing an output indicative of a near minimal cost set of connection links of remote weighted stations to a central point wherein the cost is a function of distance and a given link has a prescribed maximum weight comprising:

first means for supplying inputs of the weight of each station and of the location of each station; and computer means connected to receive inputs from said first means and programmed for mathematically solving the minimum cost condition wherein the program directs said computer means to sequentially carry out the steps of 1. connect all stations in a set of first trial links where each link weight is equal to or less than the prescribed maximum,
2. calculate the cost of each first trial link,
3. sequentially interchange stations between adjacent links to sequentially produce second sets of trial links, calculate the cost of each set of second trial links, sequentially select the lower cost set of trial links, and
4. provide an output indicative of the finally selected set of links.

5. Apparatus as claimed in claim 4 comprising; in combination means for supplying visual information signals, connected to receive the output from said computer means.

* * * * *